(12) United States Patent (10) Patent No.: US 8,355,250 B2
Yu (45) Date of Patent: Jan. 15, 2013

(54) LATCH MECHANISM AND PORTABLE COMPUTER

(75) Inventor: Ching-Jeng Yu, New Taipei (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 104 days.

(21) Appl. No.: 13/149,988

(22) Filed: Jun. 1, 2011

(65) Prior Publication Data

US 2012/0106065 A1 May 3, 2012

(30) Foreign Application Priority Data

Oct. 29, 2010 (TW) ................................ 99137299 A

(51) Int. Cl.
*H05K 5/00* (2006.01)
*H05K 7/00* (2006.01)

(52) U.S. Cl. ......... 361/679.58; 361/679.26; 361/679.27; 361/679.55; 361/679.56; 361/679.57; 361/679.59

(58) Field of Classification Search ............. 361/679.26, 361/679.27, 679.55, 679.56, 679.57, 679.58, 361/679.59
See application file for complete search history.

(56) References Cited

U.S. PATENT DOCUMENTS

| 5,253,142 | A * | 10/1993 | Weng | 361/679.56 |
| 2003/0011972 | A1* | 1/2003 | Koo | 361/681 |
| 2006/0002062 | A1* | 1/2006 | Kwon et al. | 361/680 |
| 2007/0070593 | A1* | 3/2007 | Wu et al. | 361/683 |
| 2007/0171604 | A1* | 7/2007 | Hong et al. | 361/683 |

* cited by examiner

*Primary Examiner* — Anthony Haughton
(74) *Attorney, Agent, or Firm* — Winston Hsu; Scott Margo

(57) ABSTRACT

A latch mechanism includes a first housing, a second housing, at least one guiding column, a hook whereon a fourth hole is formed, a fastening component, a latching component, and a first magnetic component for attracting the hook when a display pivots close to a host, so that the hook slides on the guiding column in a first direction to pass through the second housing, the fastening component, and the first housing. The first magnetic component drives the latching component to slide in a second direction simultaneously, so that an end of the latching component is inserted into the fourth hole on the hook, for fixing the display and the host. The latch mechanism further includes a pushing component for separating the latching component from the fourth hole on the hook when being pushed in a direction opposite to the second direction.

12 Claims, 10 Drawing Sheets

LATCH MECHANISM AND PORTABLE COMPUTER

BACKGROUND OF THE INVENTION

1. Field of the Invention

The present invention relates to a latch mechanism and a related portable computer, and more particularly, to a latch mechanism with a two-way latching function and the related portable computer.

2. Description of the Prior Art

Generally speaking, when a notebook computer is close, a latch mechanism is used for latching a monitor and a host in order to fix the monitor and the host. For example, a conventional latch mechanism often utilizes a hook structure, a latch structure, or a magnetic component to combine the monitor and the host. U.S. patent application Ser. No. 12/323,445 discloses a mechanism of using a link set with a pin to latch the monitor and the host. However, a movable component in the prior art is often disposed on the host, and a fixing component, such as the pin, is disposed on the monitor, so as to perform locking and releasing function by the movable component matching with the fixing component. In such a manner, the mechanism is more complicated. Furthermore, the movable component for performing locking or releasing function needs more mechanical space occupied by other mechanical components of the host, such as a speaker. Since there are more components disposed in the host, the mechanical space in the host is more important than that in the monitor. Moreover, a monitor of a convertible computer designed for handwriting function can be rotated by 180 degrees. When presenting to customers, the monitor can be rotated to an adequate orientation for the customers to watch contents of the presentation. It achieves two-way communication. Furthermore, the convertible computer simultaneously has a notebook computer mode and a tablet computer mode. In other words, when the monitor is rotated by 180 degrees and combined with the host, the convertible computer can be used as a tablet computer. However, a latch mechanism for the convertible computer has not been developed with a mechanism capable of two-way latching the host. In other words, a design for latch mechanism of the convertible computer based on two modes has not been developed. Thus, the conventional portable computer has important issues of the latch mechanism for two-way latching.

SUMMARY OF THE INVENTION

The present invention provides a latch mechanism and a related portable computer for solving above drawbacks.

According to the claimed invention, a latch mechanism includes a first housing having a first hole and a second hole, a second housing having a third hole, at least one guiding column disposed inside the second housing, and a hook selectively disposed inside or protruding out of the second housing and slidably installed on the guiding column. The hook has a fourth hole. The latch mechanism further includes a fastening component fixed inside the first housing, and the fastening component has a fifth hole. The latch mechanism further includes a latching component slidably installed inside the fastening component, and a first magnetic component disposed inside the first housing and connected to the latching component for attracting the hook when a display pivots close to a host, so that the hook slides on the guiding column in a first direction to pass through the third hole of the second housing, the fifth hole of the fastening component, and the first hole of the first housing. The first magnetic component drives the latching component to slide in a second direction simultaneously, so that an end of the latching component is inserted into the fourth hole of the hook, for fixing the first housing and the second housing. The latch mechanism further includes a pushing component slidably installed on the first housing and connected to the latching component for separating the latching component from the fourth hole of the hook when being pushed in a direction opposite to the second direction, for releasing fixing status of the first housing and the second housing.

According to the claimed invention, the latch mechanism further includes a resilient component with both ends being respectively connected to the pushing component and the fastening component. The resilient component drives the push component to slide in the second direction when the push component is released.

According to the claimed invention, the latch mechanism further includes a second magnetic component installed inside the fastening component. The second magnetic component and the first magnetic component repel each other.

According to the claimed invention, a guiding structure is formed on an end of the hook for guiding the end of the latching component to insert into the fourth hole of the hook.

According to the claimed invention, the latch mechanism further includes a recovering component connected to the hook. The recovering component drives the hook to slide on the guiding column in a direction opposite to the first direction so as to separate the hook from the first hole of the first housing, the fifth hole of the fastening component and the third hole of the second housing when the latching component separates from the fourth hole of the hook.

According to the claimed invention, the fastening component further comprises a sixth hole opposite to the fifth hole, the first magnetic component attracts the hook as a display rotates 180 degrees relative to the host and the display pivots close to the host, so that the hook slides on the guiding column in the first direction and passes through the third hole of the second housing, the sixth hole of the fastening component and the second hole of the first housing, and the first magnetic component drives the latching component to slide in a direction opposite to the second direction simultaneously, so that the end of the latching component is inserted into the fourth hole of the hook, for fixing the first housing and the second housing.

According to the claimed invention, a portable computer includes a host, a display pivoted to the host, and a latch mechanism for latching the display and the host. The latch mechanism includes a first housing having a first hole and a second hole, a second housing having a third hole, at least one guiding column disposed inside the second housing, and a hook selectively disposed inside or protruding out of the second housing and slidably installed on the guiding column. The hook has a fourth hole. The latch mechanism further includes a fastening component fixed inside the first housing. The fastening component has a fifth hole. The latch mechanism further includes a latching component slidably installed inside the fastening component, and a first magnetic component disposed inside the first housing and connected to the latching component for attracting the hook when a display pivots close to a host, so that the hook slides on the guiding column in a first direction to pass through the third hole of the second housing, the fifth hole of the fastening component, and the first hole of the first housing. The first magnetic component drives the latching component to slide in a second direction simultaneously, so that an end of the latching component is inserted into the fourth hole of the hook, for fixing the first housing and the second housing. The latch mechanism further includes a pushing component slidably installed on the first housing and connected to the latching component for separating the latching component from the fourth hole of the hook when being pushed in a direction opposite to the second direction, for releasing fixing status of the first housing and the second housing.

In summary, the latch mechanism of the present invention provides the two-way latch mechanism on the display for latching the host and the display. Accordingly, it can save the mechanical space in the host. Furthermore, since the present invention is capable of latching the host and the display in two ways, it can be engaged with the host and the display for both a general notebook computer mode and a tablet computer mode. As a result, the present invention provides a useful latch mechanism in practical application.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
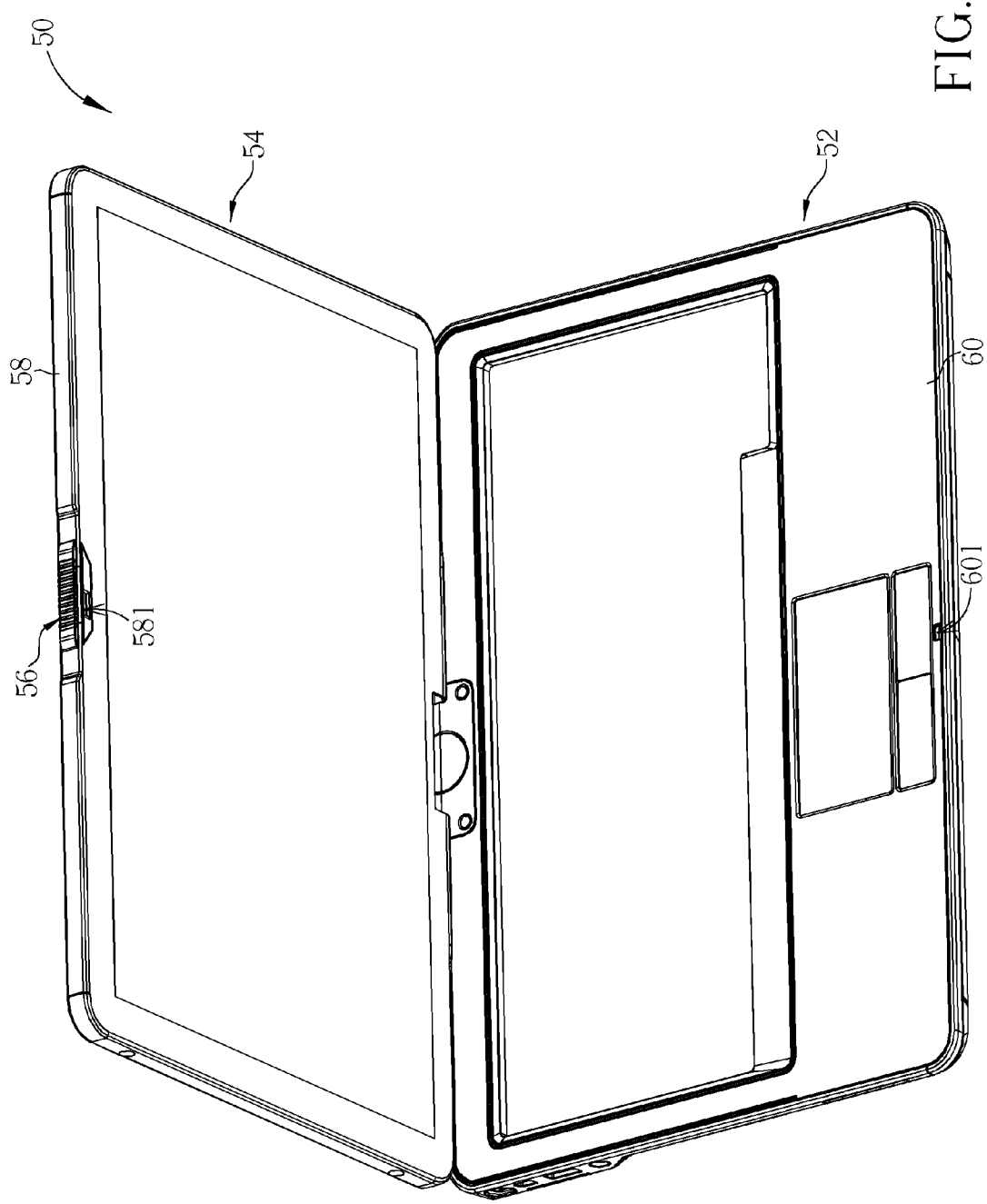
FIG. 1 and FIG. 2 are respectively schematic drawings of a portable computer in different statuses according to an embodiment of the present invention.
Figure 2:
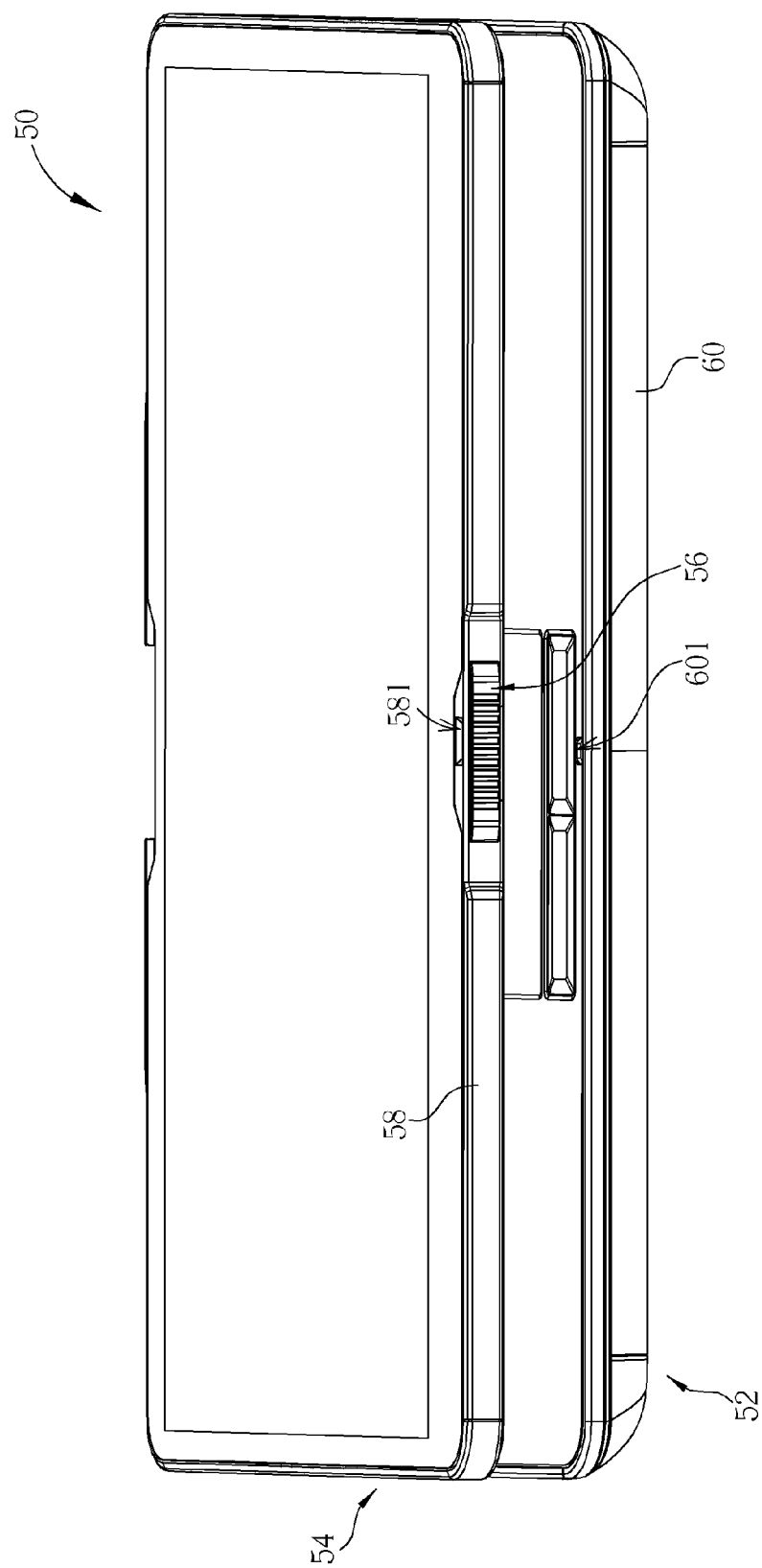

Please refer to FIG. 1 and FIG. 2. FIG. 1 and FIG. 2 are respectively schematic drawings of a portable computer 50 in different statuses according to an embodiment of the present invention. The portable computer 50 can be a notebook computer and the like. The portable computer 50 includes a host 52 and a display 54 pivoted to the host 52. For example, the monitor 54 is pivoted to the host 52 in a convertible manner, in other words, the monitor 54 can be rotated relative to the host 52 by 180 degrees. In such a manner, the portable computer 50 has two modes of a notebook computer mode and of a tablet computer mode. Furthermore, in the notebook computer mode, an additional input module, such as a keyboard, is equipped for data input, and a display surface of the monitor 54 of the notebook computer mode faces the input module when a user uses the portable computer 50 (as shown in FIG. 1). In the tablet computer mode, the monitor 54, such as a touch panel, is used to be the display interface as well as the input module, and the display surface of the monitor 54 of the tablet computer mode is opposite to the host 52 when the user uses the portable computer 50 (as shown in FIG. 2). In addition, the portable computer 50 further includes a latch mechanism 56 for latching the monitor 54 and the host 52. The latch mechanism 56 is for two-way latching, in other words, when the portable computer 50 is at the notebook computer mode as shown in FIG. 1 and at the tablet computer mode as shown in FIG. 2, the latch mechanism 56 can be engaged with the monitor 54 and the host 52 for both two modes.

Figure 3:
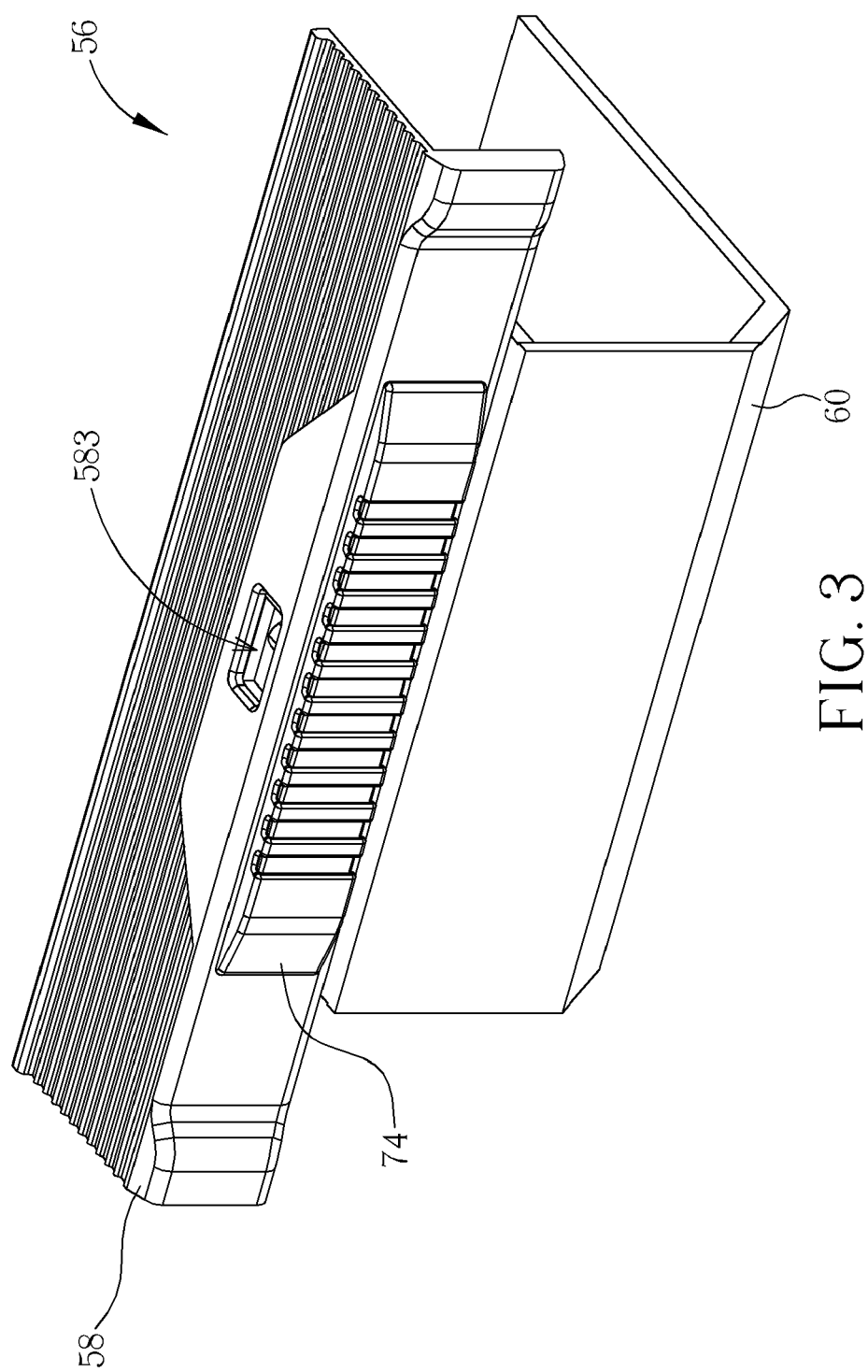
FIG. 3 and FIG. 4 are respectively diagrams in different view angles of the latch mechanism according to the embodiment of the present invention.
Figure 4:
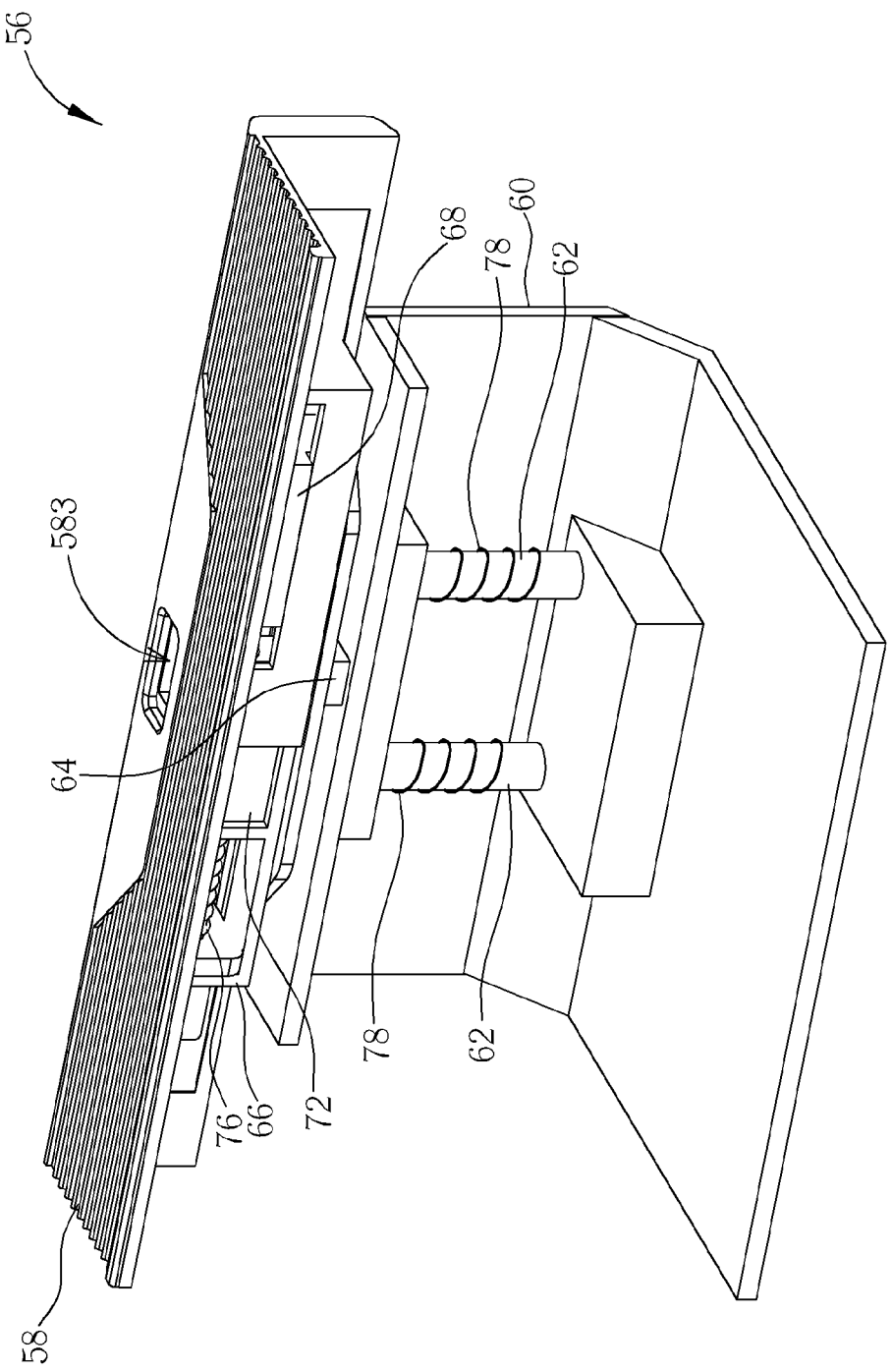
Figure 5:
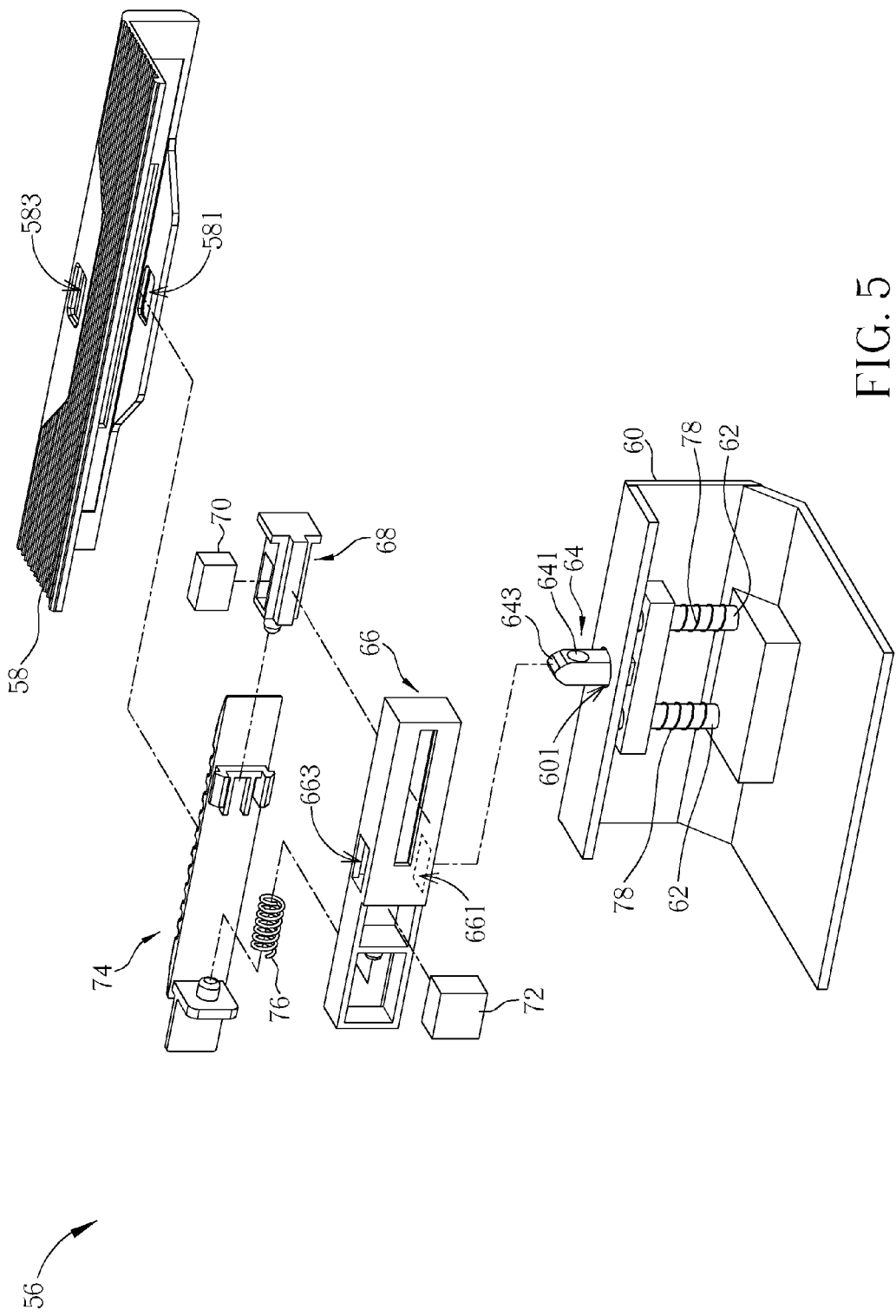
FIG. 5 is an exploded diagram of the latch mechanism according to the embodiment of the present invention.

Please refer to FIG. 3 to FIG. 5. FIG. 3 and FIG. 4 are respectively diagrams in different view angles of the latch mechanism 56 according to the embodiment of the present invention. FIG. 5 is an exploded diagram of the latch mechanism 56 according to the embodiment of the present invention. The latch mechanism 56 includes a first housing 58 disposed on the host 52. The first housing 58 has a first hole 581 and a second hole 583 on both sides. The latch mechanism 56 further includes a second housing 60 disposed on the host 52. The second housing 60 has a third hole 601. The latch mechanism 56 further includes at least one guiding column 62 disposed inside the second housing 60. In this embodiment, the latch mechanism 56 includes two guiding columns 62. The latch mechanism 56 further includes a hook 64 selectively disposed inside or protruding out of the second housing 60 and slidably installed on the guiding column 62, and the hook 64 has a fourth hole 641. A guiding structure 643 is formed on an end of the hook 64 near the fourth hole 641. The hook 64 is made of magnetic material. For example, the hook 64 can be made of metal material with magnetic permeability. The latch mechanism 56 further includes a fastening component 66 fixed inside the first housing 58. The fastening component 66 has a fifth hole 661 and a sixth hole 663 on both sides at positions corresponding to the first hole 581 and the second hole 583, respectively. The latch mechanism 56 further includes a latching component 68 slidably installed inside the fastening component 66. For example, the latching component 68 utilizes a protruding part on its lateral side to be slidably engaged in a slot of the fastening component 66, so as to slide relative to the fastening component 66. The latch mechanism 56 further includes a first magnetic component 70 disposed inside the first housing 58 and connected to the latching component 68. For example, the first magnetic component 70 can be installed in a recess of the latching component 68. The latch mechanism 56 further includes a second magnetic component 72 installed inside the fastening component 66. The second magnetic component 72 and the first magnetic component 70 can be magnets and repel each other. The first magnetic component 70 and the second magnetic component 72 can be disposed in a manner that same magnetic poles are close to each other. The latch mechanism 56 further includes a pushing component 74 slidably installed on the first housing 58 and connected to the latching component 68. The pushing component 74 is used for driving the latching component 68 when being pushed. The latch mechanism 56 further includes a resilient component 76 with both ends being respectively connected to the pushing component 74 and the fastening component 66. The resilient component 76 drives the pushing component 74 to move back to an original position when the pushing component 74 is released. The resilient component 76 can be a spring. The latch mechanism 56 further includes at least one recovering component 78 connected to the hook 64. The recovering component 78 drives the hook 64 to move back to an original position inside the second housing 60. The recovering component 78 can be a spring.

Figure 6:
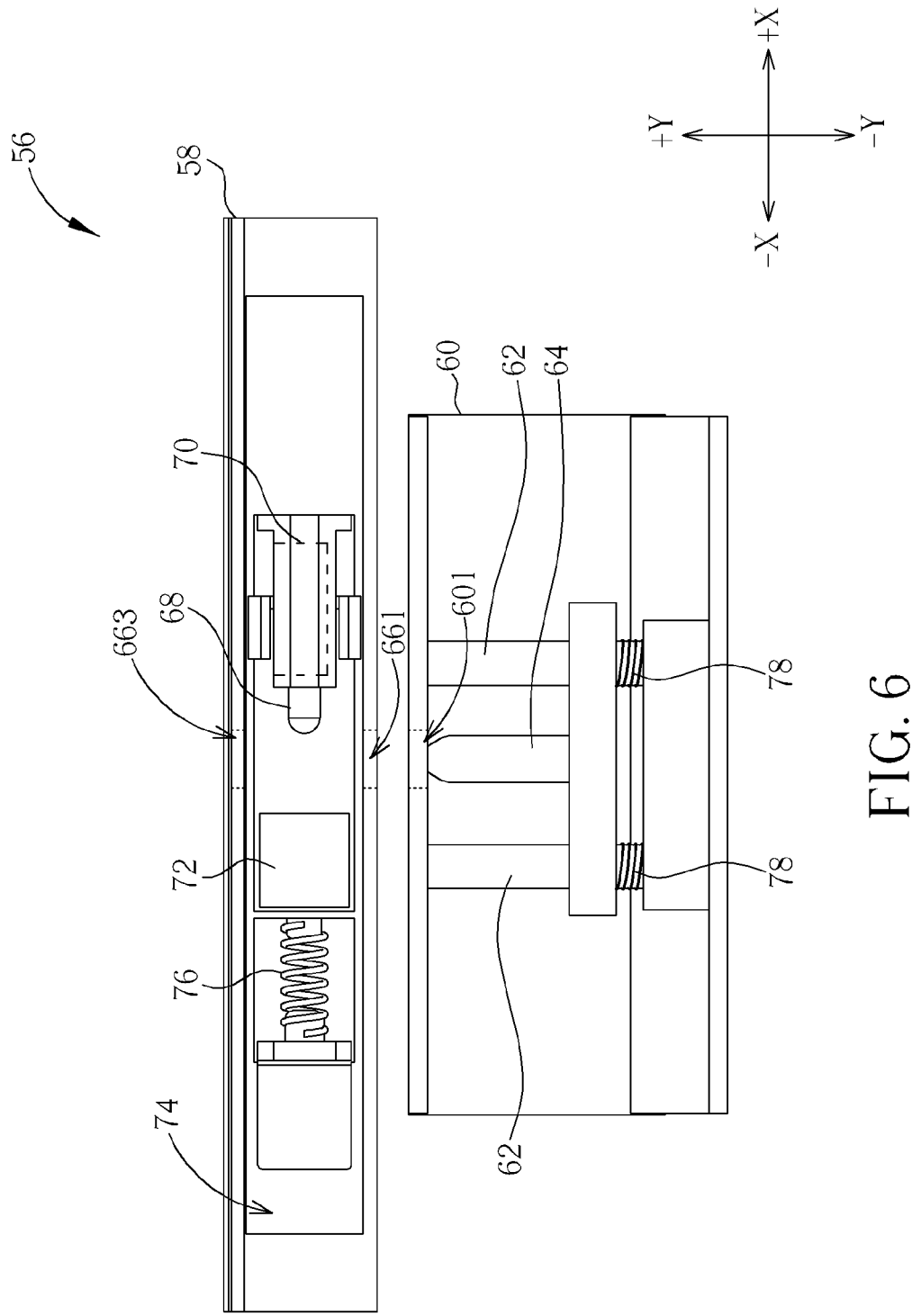
FIG. 6 to FIG. 8 are respectively diagrams of consecutive motions of internal structures of the latch mechanism according to the embodiment of the present invention.
Figure 7:
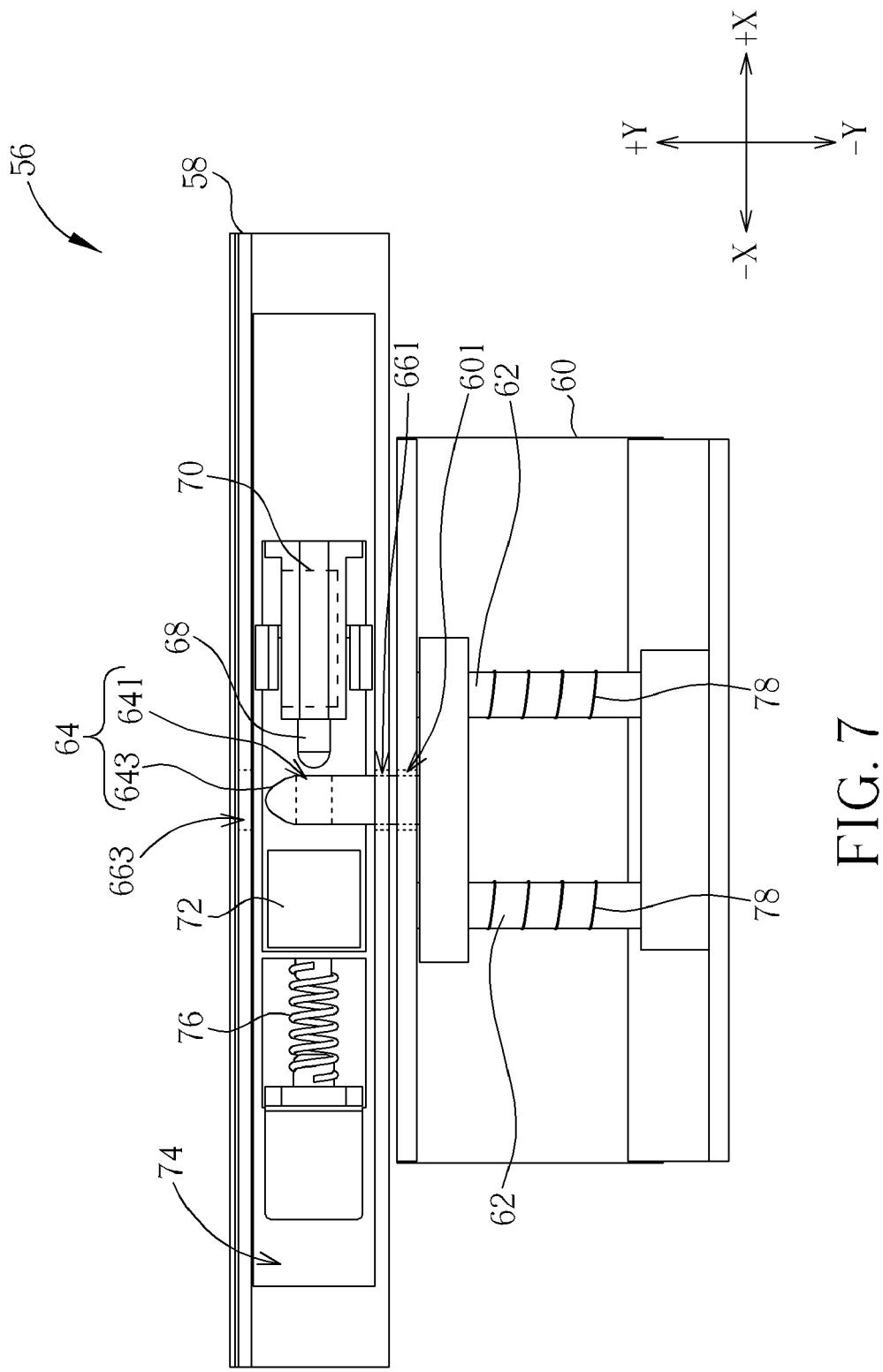
Figure 8:
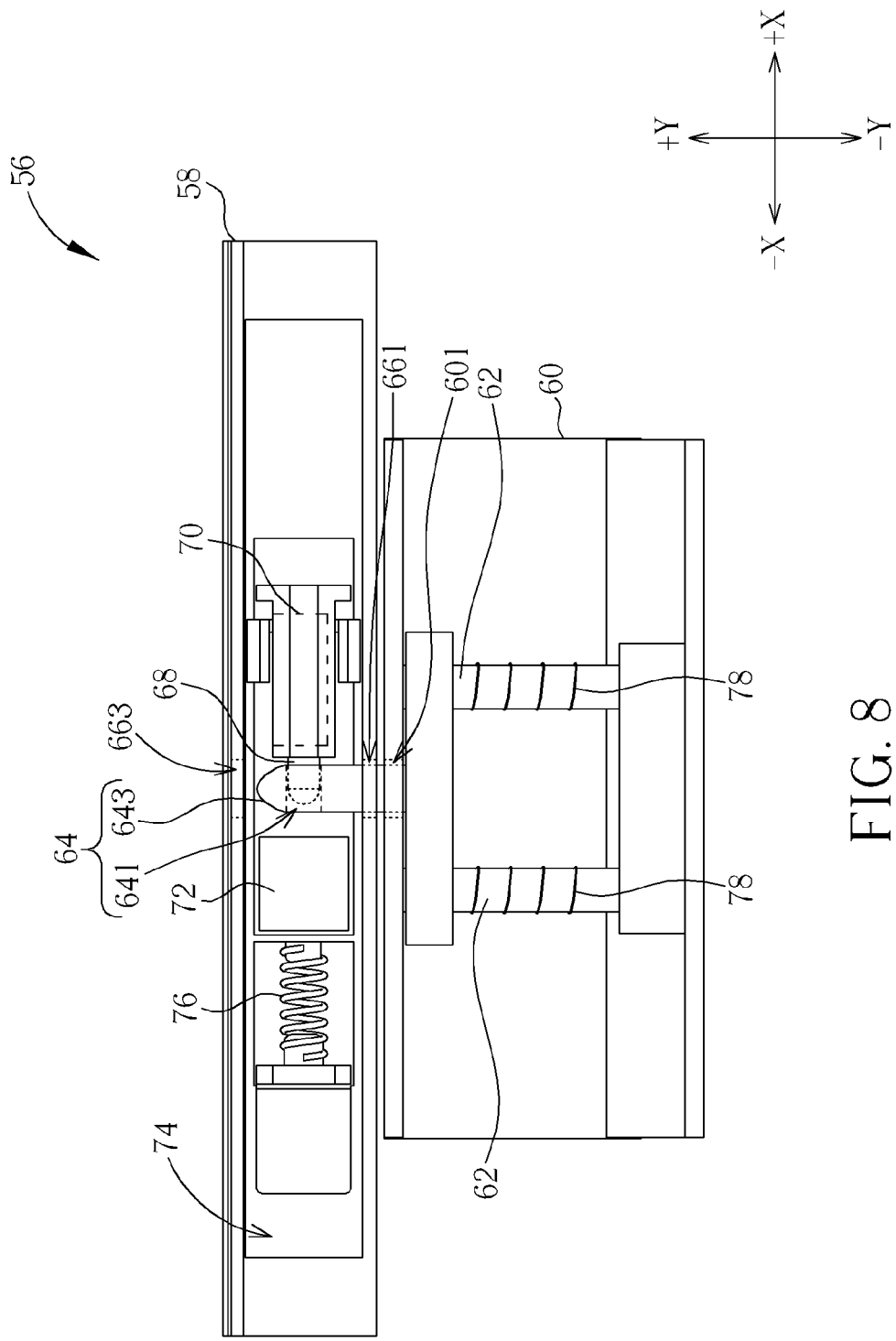
Figure 9:
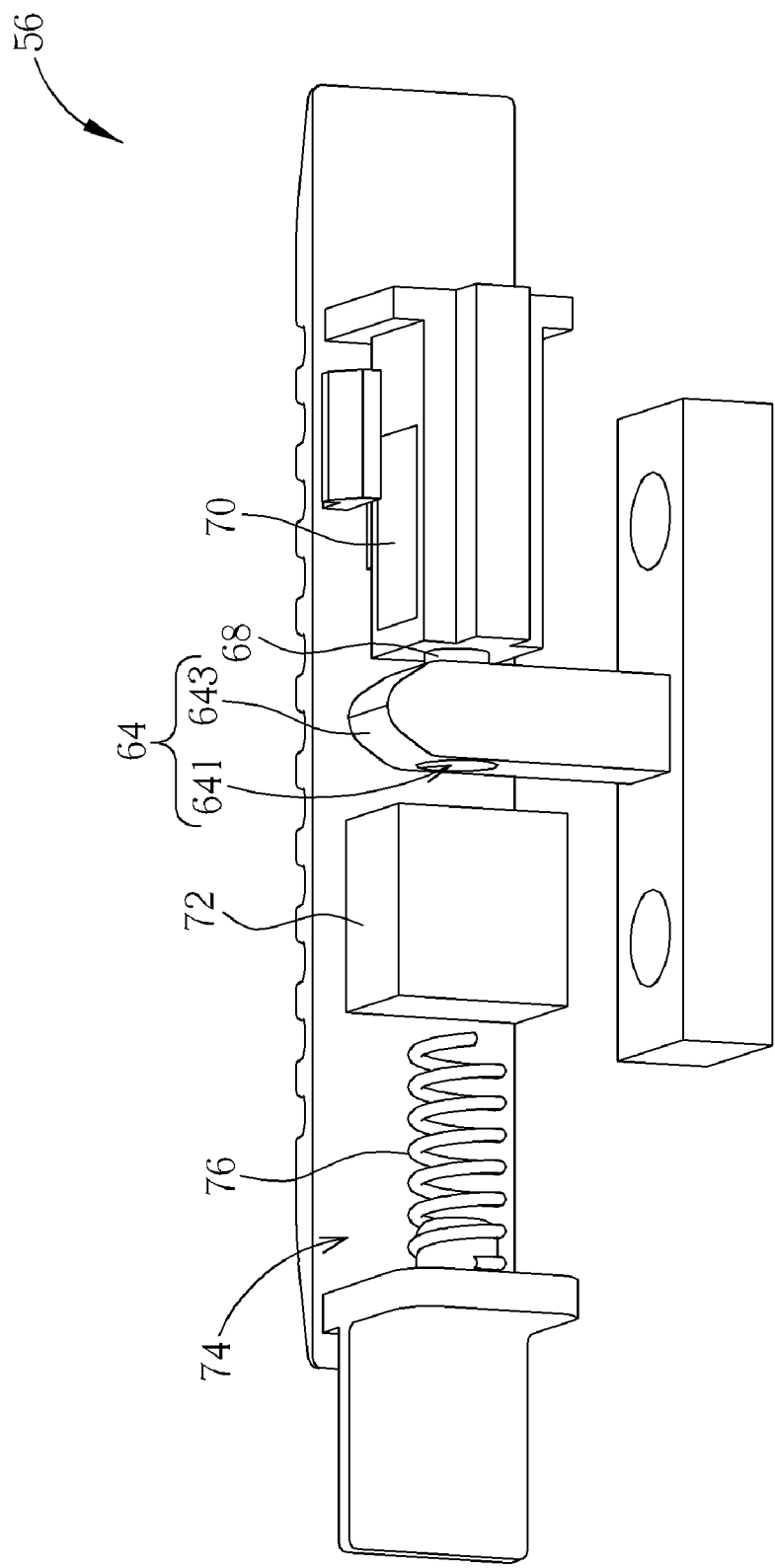
FIG. 9 is a structure diagram of the latching component being engaged with a hook according to the embodiment of the present invention.

Please refer to FIG. 1 to FIG. 9. FIG. 6 to FIG. 8 are respectively diagrams of consecutive motions of internal structures of the latch mechanism 56 according to the embodiment of the present invention. FIG. 9 is a structure diagram of the latching component 68 being engaged with the hook 64 according to the embodiment of the present invention. In order to show relative position between the latching component 68 and the hook 64 clearly, the internal components in FIG. 6 to FIG. 8 are illustrated in a perspective manner and the fastening component 66 is omitted. As shown in FIG. 6, when the display 54 is not close to the host 52, the hook 64 does not stretch out of the second housing 60 so as to prevent the hook 64 from being damaged due to collision and to keep the aesthetic feeling of the appearance. As shown in FIG. 7, when the display 54 is rotated to be close to the host 52 gradually, the hook 64 can slide on the guiding column 62 in a first direction (+Y direction) to pass through the third hole 601 of the second housing 60, the fifth hole 661 of the fastening component 66 and first hole 581 of the first housing 58 sequentially since the first magnetic component 70 inside the hook 64 attracts the hook 64 inside the second housing 60. Accordingly, the hook 64 can be accommodated inside the first housing 58. At the same time, since the attraction force between the first magnetic component 70 and the hook 64 is greater than the repelling force between the first magnetic component 70 and the second magnetic component 72, the first magnetic component 70 can drive the latching component 68 to slide close to the hook 64 in a second direction (−X direction), so that an end of the latching component 68 is inserted into the fourth hole 641 of the hook 64. Accordingly, the relative position between the display 54 and the host 52 can be fixed. The first direction can be substantially perpendicular to the second direction. In the process of the hook 64 sliding in the first direction (+Y direction) and the latching component 68 sliding in the second direction (−X direction), the guiding structure 643 of the hook 64 is used for guiding the end of the latching component 68 to insert into the fourth hole 641 of the hook 64 smoothly. In the other words, if the latching component 68 does not precisely aim at the fourth hole 641 of the hook 64, the end of the latching component 68 can still be guided by the guiding structure 643 so as to insert the fourth hole 641 of the hook 64 smoothly.

Similarly, when the user pushes the pushing component 74 to slide in a direction opposite to the second direction (+X direction), the pushing component 74 drives the end of the latching component 68 to separate from the fourth hole 641 of the hook 64, so as to release the fixing status of the display 54 and the host 52. In such a manner, the user can rotate the display 54 far from the host 52. It should be noticed that the resilient component 76 will provide a resilient force to the pushing component 74 due to deformation in +X direction, so as to drive the pushing component 74 to slide back to the original position in the second direction (−X direction). At the same time, since the first magnetic component 70 is far from the hook 64, the attraction force between the first magnetic component 70 and the hook 64 is smaller than the repelling force between the first magnetic component 70 and the second magnetic component 72, so as to drive the latching component 68 to slide back to the position shown in FIG. 6 in the +X direction. In such a manner, the hook 64 will not interfere with the latching component 68 when the hook 64 is again inserted into the first housing 58. Furthermore, when the latching component 68 separates from the fourth hole 641 of the hook 64, the recovering component 78 connected to the hook 64 drives the hook 64 to slide on the guiding column 62 in a direction opposite to the first direction (−Y direction) so as to separate the hook 64 from the first hole 581 of the first housing 58, the fifth hole 661 of the fastening component 66 and the third hole 601 of the second housing 60. Accordingly, the hook 64 can be contained inside the second housing 60, so as to prevent the hook 64 from being damaged due to collision and to keep the aesthetic feeling of the appearance. The recovering component 78 can be a spring. In other words, the recovering component 78 is stretched when the hook 64 slides in the first direction (+Y direction). When the latching component 68 separates from the fourth hole 641 of the hook 64, the recovering component 78 which is stretched in the first direction (+Y direction) will provide a resilient force to the hook 64, so as to drive the hook 64 to slide back to the original position in −Y direction. Additionally, the recovering component 78 can be omissible. In other words, the hook 64 can slide back to the original position in −Y direction by its gravity when the latching component 68 separates from the fourth hole 641 of the hook 64.

Figure 10:
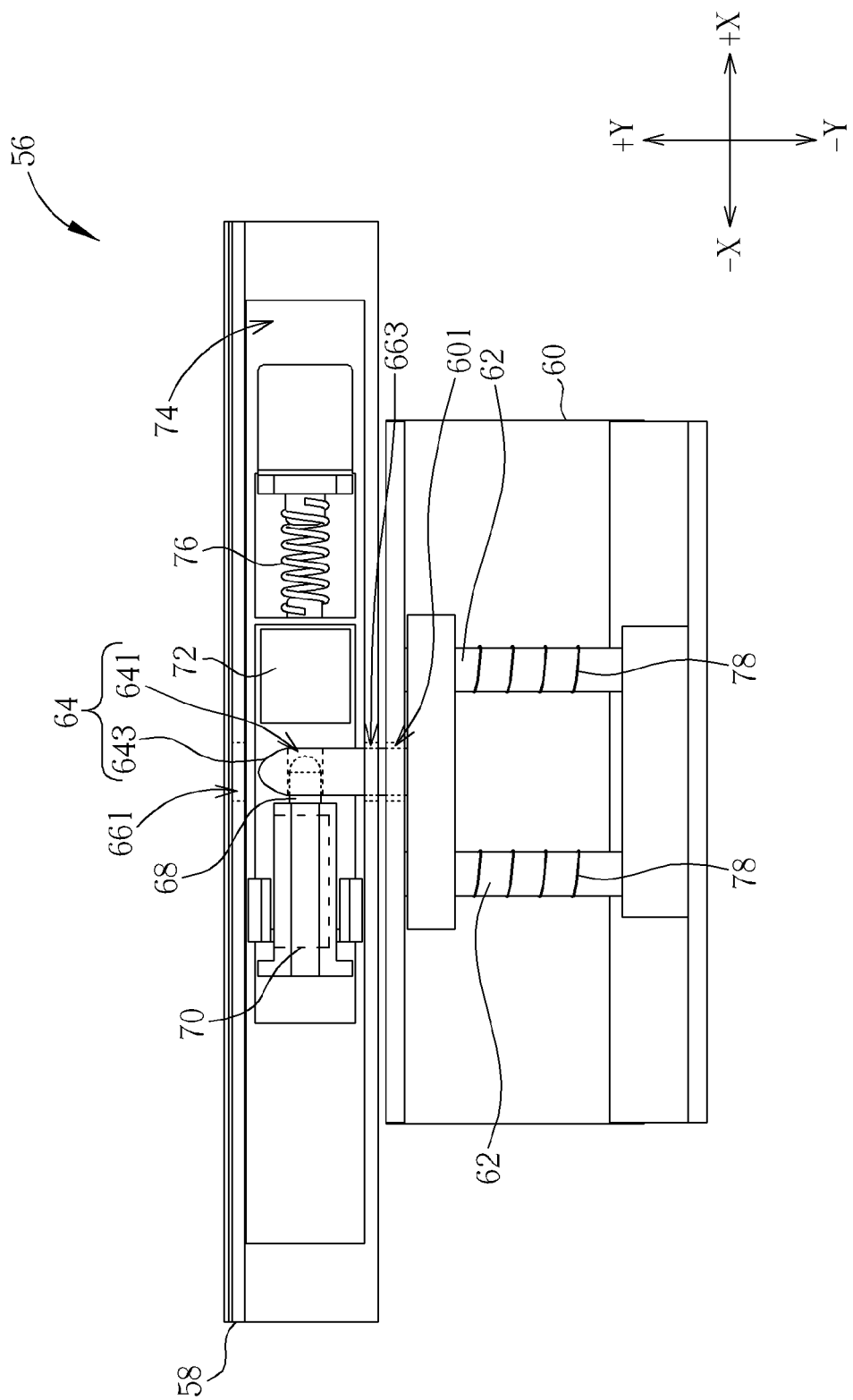
FIG. 10 is an internal structure diagram of the latching component being engaged with another side of the hook according to the embodiment of the present invention.

On the other hand, in order to achieve the two-way latching function, the first housing 58 has a second hole 583 opposite to the first hole 581, and the fastening component 66 has a sixth hole 663 opposite to the fifth hole 661. Accordingly, the hook 64 can pass through the third hole 601 of the second housing 60, the sixth hole 663 of the fastening component 66, and the second hole 583 of the first housing 58, so that the end of the latching component 68 inserts into the fourth hole 641 of the hook 64 so as to fix the relative position between the display 54 and the host 52, after the monitor 54 is rotated relative to the host 52 by 180 degrees. As shown in FIG. 10, FIG. 10 is an internal structure diagram of the latching component 68 being engaged with another side of the hook 64 according to the embodiment of the present invention. As mentioned above, the first magnetic component 70 inside the first housing 58 attracts the hook 64 inside the second housing 60 when the display 54 rotates 180 degrees relative to the host 52 and the display 54 pivots close to the host 52, so that the hook 64 slides on the guiding column 62 in the first direction (+Y direction) and passes through the third hole 601 of the second housing 60, the sixth hole 663 of the fastening component 66 and the second hole 583 of the first housing 58. Accordingly, the hook 64 can be contained inside the first housing 58. At the same time, the first magnetic component 70 drives the latching component 68 to slide in the direction opposite to the second direction (+X direction) simultaneously, so that the end of the latching component 68 is inserted into the fourth hole 641 of the hook 64, for fixing the display 54 and the host 52. The working principle is identical to that mentioned in the aforementioned embodiment, so it is omitted herein.

Compared with the prior art, the latch mechanism of the present invention provides the two-way latch mechanism on the display for latching the host and the display. Accordingly, it can save the mechanical space in the host. Furthermore, since the present invention is capable of latching the host and the display in two ways, it can latch the host and the display for both a general notebook computer mode and a tablet computer mode. As a result, the present invention provides a useful latch mechanism in practical application.

Those skilled in the art will readily observe that numerous modifications and alterations of the device and method may be made while retaining the teachings of the invention.

What is claimed is:
1. A latch mechanism comprising:
a first housing having a first hole and a second hole;
a second housing having a third hole;
at least one guiding column disposed inside the second housing;
a hook selectively disposed inside or protruding out of the second housing and slidably installed on the guiding column, the hook having a fourth hole;
a fastening component fixed inside the first housing, the fastening component having a fifth hole;
a latching component slidably installed inside the fastening component;

a first magnetic component disposed inside the first housing and connected to the latching component for attracting the hook when a display pivots close to a host, so that the hook slides on the guiding column in a first direction to pass through the third hole of the second housing, the fifth hole of the fastening component, and the first hole of the first housing, the first magnetic component driving the latching component to slide in a second direction simultaneously, so that an end of the latching component is inserted into the fourth hole of the hook, for fixing the first housing and the second housing; and a pushing component slidably installed on the first housing and connected to the latching component for separating the latching component from the fourth hole of the hook when being pushed in a direction opposite to the second direction, for releasing fixing status of the first housing and the second housing.

2. The latch mechanism of claim 1, further comprising a resilient component with both ends being respectively connected to the pushing component and the fastening component, the resilient component driving the push component to slide in the second direction when the push component is released.

3. The latch mechanism of claim 1, further comprising a second magnetic component installed inside the fastening component, the second magnetic component and the first magnetic component repelling each other.

4. The latch mechanism of claim 1, wherein a guiding structure is formed on an end of the hook for guiding the end of the latching component to insert into the fourth hole of the hook.

5. The latch mechanism of claim 1, further comprising a recovering component connected to the hook, the recovering component driving the hook to slide on the guiding column in a direction opposite to the first direction so as to separate the hook from the first hole of the first housing, the fifth hole of the fastening component and the third hole of the second housing when the latching component separates from the fourth hole of the hook.

6. The latch mechanism of claim 1, wherein the fastening component further comprises a sixth hole opposite to the fifth hole, the first magnetic component attracts the hook as a display rotates 180 degrees relative to the host and the display pivots close to the host, so that the hook slides on the guiding column in the first direction and passes through the third hole of the second housing, the sixth hole of the fastening component and the second hole of the first housing, and the first magnetic component drives the latching component to slide in a direction opposite to the second direction simultaneously, so that the end of the latching component is inserted into the fourth hole of the hook, for fixing the first housing and the second housing.

7. A portable computer comprising:
   a host;
   a display pivoted to the host; and
   a latch mechanism for latching the display and the host, the latch mechanism comprising:
      a first housing having a first hole and a second hole;
      a second housing having a third hole;
      at least one guiding column disposed inside the second housing;
      a hook selectively disposed inside or protruding out of the second housing and slidably installed on the guiding column, the hook having a fourth hole;
      a fastening component fixed inside the first housing, the fastening component having a fifth hole;
      a latching component slidably installed inside the fastening component;
      a first magnetic component disposed inside the first housing and connected to the latching component for attracting the hook when a display pivots close to a host, so that the hook slides on the guiding column in a first direction to pass through the third hole of the second housing, the fifth hole of the fastening component, and the first hole of the first housing, the first magnetic component driving the latching component to slide in a second direction simultaneously, so that an end of the latching component is inserted into the fourth hole of the hook, for fixing the first housing and the second housing; and
      a pushing component slidably installed on the first housing and connected to the latching component for separating the latching component from the fourth hole of the hook when being pushed in a direction opposite to the second direction, for releasing fixing status of the first housing and the second housing.

8. The portable computer of claim 7, further comprising a resilient component with both ends being respectively connected to the pushing component and the fastening component, the resilient component driving the push component to slide in the second direction when the push component is released.

9. The portable computer of claim 7, further comprising a second magnetic component installed inside the fastening component, the second magnetic component and the first magnetic component repelling each other.

10. The portable computer of claim 7, wherein a guiding structure is formed on an end of the hook for guiding the end of the latching component to insert into the fourth hole of the hook.

11. The portable computer of claim 7, further comprising a recovering component connected to the hook, the recovering component driving the hook to slide on the guiding column in a direction opposite to the first direction so as to separate the hook from the first hole of the first housing, the fifth hole of the fastening component and the third hole of the second housing when the latching component separates from the fourth hole of the hook.

12. The portable computer of claim 7, wherein the fastening component further includes a sixth hole opposite to the fifth hole, the first magnetic component attracts the hook when the display rotates 180 degrees relative to the host and the display pivots close to the host, so that the hook slides on the guiding column in the first direction and passes through the third hole of the second housing, the sixth hole of the fastening component and the second hole of the first housing, and the first magnetic component drives the latching component to slide in a direction opposite to the second direction simultaneously, so that the end of the latching component is inserted into the fourth hole of the hook, for fixing the first housing and the second housing.

* * * * *